3,254,015
PROCESS FOR TREATING PLATINUM-COATED ELECTRODES

Raymond Steele, West Chester, Pa., assignor to J. Bishop & Co. Platinum Works, Malvern, Pa., a corporation of Pennsylvania
No Drawing. Filed July 28, 1961, Ser. No. 127,480
11 Claims. (Cl. 204—290)

This invention relates to a process for treating electrodeposited or other platinum layers on electrodes and has for an object the improved process of treating platinum-coated electrodes so as to produce anode surfaces which have low overvoltage characteristics for the electrolysis of solutions.

The present invention is particularly applicable to the treatment of electrodes for the electrolysis of brine to manufacture chlorine and caustic soda. The most commonly used anode material in the electrolysis of brine is graphite. Graphite is sufficiently resistant to chlorine and low enough in cost to justify its use as an anode material for chlorine production when compared with other materials or combinations of materials which have been available in the past. Nevertheless, the use of graphite anodes has entailed a number of costly disadvantages due principally to its gradual disintegration in the corrosive and erosive cell environment. The need for an improved anode material has been recognized for many years and various types of metallic anodes have been proposed in the past. Among these are solid or massive platinum, platinum covered with platinum black (called "platinized platinum"), platinum-plated tantalum and platinum-plated titanium. The platinized platinum and massive platinum electrodes are generally prohibitive for commercial use by reason of their high cost. Moreover, a platinum black surface is impractical in any case because of the extreme fragility of this form of platinum. Thus the platinum-plated or coated electrodes have been receiving more consideration for use in chlorine cells although their initial cost is substantially more than that of graphite anodes. Tests on platinum-plated anodes have indicated that the rate of loss of platinum in brine electrolysis is in the order of 0.5 gram of platinum or less per ton of chlorine produced. The cost of this is less than that of the seven to fifteen pounds of graphite per ton of chlorine which is commonly lost in the chlorine process. In addition to this saving in anode material cost, adoption of these metallic anodes is expected to lead to lower power costs, lower labor costs due to less frequent anode and diaphragm replacement, and other savings and advantages such as the production of purer chlorine and a higher current efficiency.

In the electrolysis of solutions for the production of chlorine and the like, one of the major costs is that of electric power. From the standpoint of power savings, it will be apparent that metallic anodes will reduce power consumption at a number of points in the cell circuit. For example, the voltage drop at the connection between the anode and power leads will be lowered due to better electrical contact between them. The voltage drop through the anode itself will not increase during use as in the case of graphite which decreases in cross section area as it disintegrates. In diaphragm cells a voltage drop occurs through the asbestos diaphragm and this increases as the diaphragm becomes progressively clogged during use. Such clogging is in large part due to particles of graphite carried over from the eroding anodes and hence its occurrence and effect will be considerably less in cells equipped with metallic anodes. The voltage drop through the electrolyte between the anode and cathode remains substantially constant when metallic anodes are employed. This is in contrast to the situation with graphite anodes which for example may decrease from 1¼" to less than ¼" in thickness during use. This decrease is accompanied by an increase in the anode-cathode gap and a corresponding increase in voltage drop through the brine.

In the operation of commercial chlorine cells, the voltage is usually increased as required to maintain a constant current and steady chlorine production. In a typical example of a diaphragm cell operating at 0.8 ampere per square inch anode current density, the voltage, after installation of a new set of graphite anodes, is 3.5 volts and this rises to 4.2 volts in about seven months when the anodes have become so worn that they must be replaced. Thus, the average cell voltage is about 3.85 volts or 0.35 volt above its initial level. This increase in voltage represents a direct increase in the cost of producing chlorine. For example, in areas where power costs are in the order of $0.006 per kilowatt hour, the increase of 0.35 volt imposes an additional cost of about $1.51 per ton of chlorine. This additional cost may be substantially reduced or eliminated by replacing graphite anodes with platinum-plated metallic anodes.

One of the most important factors related to power consumption and not taken into consideration in the above paragraph is the voltage drop at the anode surface due to the chlorine overvoltage of the anode material. Overvoltage may be defined as that voltage in excess of the reversible or equilibrium E.M.F. which must be applied to cause an electrode reaction to take place at a desired rate. Chlorine overvoltage varies with the anode material and its physical condition. It increases with anode current density but decreases with increase in temperature.

In operating various anodes in brine electrolysis, it will be noted that the current will fall off from its initial level unless upward adjustments in the cell voltage are made. This is largely due to an increase in the chlorine overvoltage at the anode. The magnitude of this additional voltage or overvoltage is, as previously noted, a function of the electrode composition and its physical condition. The time required for the overvoltage to reach a constant level is less at high current densities, but in any case may vary from a matter of a few minutes to a number of hours.

It is well-known that anodes coated with platinum black have the lowest overvoltage in the liberation of chlorine electrolytically. However, as pointed out above, the fragile nature of platinum black makes it practically prohibitive for commercial use. The present invention is concerned with the treatment of sound platinum deposits so as to lower the overvoltage thereof to closely approximate that of the platinum black surface.

In accordance with the present invention, there is provided a method of treating an electrode having a coating including at least one noble metal of the platinum group to provide an improved surface for catalyzing electrode reactions by first charging the coating with hydrogen and then removing at least part of the hydrogen by heating the electrode to a predetermined temperature and for a time sufficient to produce at least some recrystallization of the platinum. The platinum group includes the noble metals in Group VIII of the periodic chart, namely, ruthenium, rhodium, palladium, osmium, iridium and platinum and the coating on the electrode may comprise an alloy of two or more such metals. The coating may be charged with hydrogen by electrolyzing it cathodically in an alkaline solution and the heating may be done in air at a temperature within the range of from 700° F. to 1000° F. for a period sufficient to bring about some recrystallization of the platinum. Good results have been obtained when heating for periods from a few minutes to an hour.

In order to illustrate the improved results obtained by the present invention in treating platinum-coated electrodes, the following is a chart in which chlorine overvoltages of a platinum black or platinized platinum anode were used as a standard and showing chlorine overvoltages of other anodes relative to the chlorine overvoltages of a platinum black anode. Subsequent references to chlorine overvoltages will mean overvoltages relative to those of a platinum black electrode. The measurements taken were reduced by the corresponding values measured in testing the platinum black anode standard.

TABLE.—CHLORINE OVERVOLTAGES OF ANODES RELATIVE TO CHLORINE OVERVOLTAGE OF PLATINUM BLACK ANODE

| Anode Current Density Amps./Sq. In. | A Pt-Ti No Treatment, Volt | B Pt-Ti Heated only, Volt | F Pt-Ti Electro. only, Volt | C Pt-Ti Treated, Volt | D Pt-Ti Treated, Volt | E Pt-Ti Treated, Volt | Massive Platinum, Volts | Graphite, Volts |
|---|---|---|---|---|---|---|---|---|
| 0.4 | 0.34 | 0.17 | 0.21 | 0.03 | 0.05 | 0.01 | 0.36 | 0.18 |
| 0.6 | 0.36 | 0.20 | 0.23 | 0.01 | 0.04 | 0.03 | 0.40 | 0.27 |
| 0.8 | 0.40 | 0.25 | 0.27 | 0.04 | 0.07 | 0.02 | 0.44 | 0.35 |
| 1.0 | 0.41 | 0.27 | 0.29 | 0.03 | 0.08 | 0.02 | 0.46 | 0.46 |
| 1.2 | 0.44 | 0.29 | 0.29 | 0.03 | 0.09 | 0.03 | 0.53 | 0.57 |
| 1.4 | 0.45 | 0.31 | 0.31 | 0.03 | 0.09 | 0.07 | | |
| 1.6 | 0.49 | 0.37 | 0.37 | 0.07 | 0.14 | 0.08 | | |
| 1.8 | | 0.42 | | 0.11 | 0.20 | 0.15 | | |
| 2.0 | | | | 0.18 | 0.27 | 0.21 | | |
| 2.2 | | | | | | | | |
| 2.4 | | | | | | | | |

In obtaining the data in the above table for each of the anodes, a small unsubmerged diaphragm-type cell made with plastic frames was employed. An anode was inserted through a slot down into the anode compartment which was enclosed between two asbestos diaphragms each located parallel to and about ½″ from the opposite faces of the anode. The diaphragms rested against perforated stainless steel sheet cathodes. A saturated brine solution at 90°–95° C. entered the anode compartment, slowly passed through the diaphragms and contacted the cathodes where hydrogen evolved and caustic soda formed. The caustic soda in solution with unreacted sodium chloride drained out through a bottom outlet of a steel shell in which the cell was enclosed. A glass tube projected through the side of the anode compartment at a height of about 5″ and a dropwise overflow of electrolyte through this tube gave visual assurance that the brine depth in the anode compartment was at working level during electrolysis. The reference electrode was a platinum wire wound spirally around a thermometer which was inserted into the cell in a fixed position relative to the anode being tested. The difference in potential between the reference electrode and the anode was measured by suitable equipment.

From tests of the various anode materials, it was found that for anode current densities of from 0.4 to 1.2 amperes per square inch, the chlorine overvoltage for massive platinum anodes varied from 0.36 volt to 0.53 volt. Similarly, for graphite anodes, the chlorine overvoltage ranged from 0.18 volt to 0.57 volt. This data is shown in the above table. The anodes identified in the table by the letters A, B, C, D, E and F were all cut from the same 1/16″ thick sheet of commercial grade titanium and each measured 9″ x 1″ and was plated for 5″ of its length on both sides with a platinum deposit approximately fifty millionths of an inch thick to provide a platinum plated area of about ten square inches. Prior to plating, the electrodes A–F were first etched in a dilute hydrofluoric acid-nitric solution and then in concentrated hydrochloric acid at 45° C. for about 1¼ hours. The acid etch removed about 0.025 gram of titanium per square inch. The plating was done in a sulphato-dinitrito-platinous acid solution. Such solution is know commercially as a DNS platinum plating bath. Prior to use this solution was boiled to raise its current efficiency for plating from about 10% to 17.5%. The bath temperature was 50° C., the current density was 0.05 ampere per square inch and the plating was carried out for about thirty-four minutes.

From the table it will be noted that the electrode A, which is platinum-plated titanium and not treated in accordance with the present invention, developed overvoltages approaching those of massive platinum which, in turn, are close to those of graphite. Anode A was operated in a chlorine cell for one hour at 18 amperes (1.8 amperes per square inch) and for an additional sixteen hours at 10 amperes prior to measuring overvoltages at the various anode current densities.

The platinum-plated titanium anode identified by letter B was heated for a period of ten minutes at 850° F. It then was operated in the chlorine cell for 1½ hours at 18 amperes and twenty-two hours at 10 amperes prior to measuring the overvoltages.

The anode C from the table was electrolyzed at 0.1 ampere per square inch in an alkaline solution made up with 54 grams of sodium hydroxide and 17.5 ml. of phosphoric acid per liter. The temperature of the sodium phosphate solution was from 50° to 60° C. The electrode was successively made anode for one minute, cathode for one minute, anode for two minutes and cathode for two minutes. It was then heated for ten minutes at 850° F. and was run in the chlorine cell for one hour at 18 amperes and 22½ hours at ten amperes prior to measuring overvoltages.

Electrode D was treated in the same manner as electrode C except that the current density employed during electrolysis in the sodium phosphate solution was higher, namely one ampere per square inch. This electrode was run in the chlorine cell for forty-six hours at 18 amperes prior to measuring overvoltages.

Electrode E from the table was electrolyzed in the same sodium phosphate solution at 0.1 ampere per square inch but the electrolysis was limited to a single cathodic treatment for three minutes. It was then heated for ten minutes at 850° F. This anode was run in the chlorine cell for 16½ hours at 18 amperes prior to measuring overvoltages.

The electrode F from the table was electrolyzed cathodically in the same manner as electrode E. However, the heating step was omitted. This anode was run in the chlorine cell for tweny-three hours prior to measuring overvoltages.

Another electrode treated like electrode C was run in the chlorine cell for one-hundred twenty hours at 18 amperes. At the end of this period, its overvoltage was approximately the same as that of electrode C, thus indicating that electrodes treated in accordance with the present invention tend to maintain a substantially uniform low overvoltage throughout a relatively long period of time.

From the foregoing and the table, it will be seen that by merely heating platinum-plated titanium anodes to a temperature within the range of 700° F. to 1000° F., the overvoltages of platinum-plated titanium anode can be reduced as much as one-half. Such a comparison may be seen between electrodes A and B in the table. From the data for electrode F it will be seen that by electrolyzing platinum-plated titanium electrodes, the overvoltages for a normal platinum-plated titanium electrode can be reduced by as much as one-third. This may be seen by comparing the data of electrodes A and F in the table. Applicant has discovered that by first electrolyzing and then heating the electrodes, the overvoltages for the platinum-plated titanium electrode can be reduced by as much as 90%. This is an unexpected result. Moreover, the overvoltages of the electrodes C, D and E treated according to the process of the present invention not only tend to approach that of the platinized platinum anode but their surfaces are firm and durable in contrast to the fragile, spongy surface which is characteristic of platinum black.

It will be appreciated that differences in cell voltage correspond to differences in overvoltage when all other factors affecting cell voltage are equivalent. Reference to the table shows that overvoltage of a treated platinum-coated anode is about 0.3 volt less than that of an untreated platinum-coated anode at the 0.8 ampere per square inch current density which is commonly used in diaphragm cells for chlorine production. With the cost of electric power at $0.006 per kilowatt hour, as mentioned above, a reduction in power costs of about $1.29 per ton chlorine can be obtained by utilizing the platinum-coated anodes treated in accordance with the present invention as compared with untreated platinum-coated anodes.

The charging of platinum-coated anodes may be obtained by electrolyzing within a relatively wide current range and for time periods varying inversely with current density.

The improvement in the overvoltage characteristics of the platinum coating is believed to be due to a physical change which enables the platinum to catalyze the electrode reaction more effectively. While the actual explanation is not known, it is believed that a physical change brought about by recrystallizing the platinum simultaneously with the desorption of the hydrogen which was taken up during the preceding cathodic electrolysis results in an increase in surface area or some other favorable change in the platinum coating. While the preferred form of the invention has been described in connection with the treating of titanium or titanium alloy electrodes plated with platinum, it is to be understood that the invention is also applicable to other electrode materials coated with platinum or platinum alloy layers or layers of other platinum group metals or their alloys. The coating, while preferably accomplished by plating, may also be done by other well-known techniques, such as vapor deposition, sputtered deposition, and painting platinum compounds on a surface and subsequently decomposing these compounds.

While the present invention has been described specifically in connection with the providing of improved electrodes for chlorine production, it is to be understood that such treatment is applicable to electrodes for other electrolytic processes which can be benefited by an electrode with an improved surface for catalyzing electrode reactions, for example, fuel cell electrodes.

What is claimed is:

1. The method of lowering the overvoltage of a platinum-coated anode for a chlorine cell comprising first charging the platinum with hydrogen by electrolyzing it cathodically in a solution which is free of platinum until evolution of hydrogen occurs on its surface, and then heating the anode to a temperature within the range of from 700° F. to 1000° F. for a time sufficient to produce at least some recrystallization of the platinum.

2. The method of lowering the overvoltage of an electrode having a coating including at least one noble metal of the platinum group comprising charging the coating with hydrogen by electrolyzing it cathodically in a solution which is free of platinum group metals until evolution of hydrogen occurs on its surface, and then heating the electrode to a temperature within the range of from 700° F. to 1000° F. for a time which produces at least some recrystallization of the coating.

3. The method according to claim 2 wherein the electrode is charged with hydrogen by electrolyzing it cathodically in an alkaline solution.

4. The method of lowering the overvoltage of a platinum-coated anode for a chlorine cell comprising first charging the platinum with hydrogen by electrolyzing it cathodically in an alkaline solution which is free of platinum until evolution of hydrogen occurs on its surface, and then heating the anode to a temperature within the range of from 700° F. to 1000° F. for a time which produces at least some recrystallization of the platinum.

5. The method according to claim 4 wherein said alkaline solution comprises a sodium phosphate solution.

6. The method of claim 4 wherein the platinum is charged with hydrogen by electrolyzing it cathodically within a current range of about 0.01 to 10.0 amperes per square inch.

7. The method of claim 6 wherein the anode is electrolyzed cathodically for a period of about five seconds to three minutes.

8. An electrode treated in accordance with the method of claim 2.

9. An anode treated in accordance with the method of claim 1.

10. The method of lowering the overvoltage of a platinum-coated anode for a chlorine cell comprising charging the platinum with hydrogen by electrolyzing it cathodically for a period of about one to three minutes in a sodium phosphate solution at about 0.1 ampere per square inch, and then heating the anode at a temperature of about 850° F. for a period of about ten minutes.

11. A titanium electrode having a coating including at least one noble metal of the platinum group and treated in accordance with the method of claim 2.

References Cited by the Examiner

UNITED STATES PATENTS 2,987,453    6/1961    Du Rose _____ 204—290

FOREIGN PATENTS 623,718    7/1961    Canada.

OTHER REFERENCES

Cotton, "Platinum Metals Review," vol. 2 (April 1958), pages 45, 46 and 47.

JOHN H. MACK, *Primary Examiner.*